United States Patent [19]

Smith

[11] 4,111,409

[45] Sep. 5, 1978

[54] UNIVERSAL JIG FOR TABLE ROTARY CUTTING TOOLS

[75] Inventor: Willis A. Smith, Pleasantville, N.Y.

[73] Assignee: Russell W. Wasylchak, Red Hook, N.Y. ; a part interest

[21] Appl. No.: 794,533

[22] Filed: May 6, 1977

[51] Int. Cl.² ............................................. B23Q 1/04
[52] U.S. Cl. ................................... 269/304; 83/435.1; 83/467 R
[58] Field of Search ...................... 83/409, 435.1, 522, 83/467, 468; 269/315, 318, 319, 295, 303, 304

[56] References Cited

U.S. PATENT DOCUMENTS

| | | | |
|---|---|---|---|
| 2,789,596 | 4/1957 | Barnes et al. ........................... | 83/467 |
| 2,895,515 | 7/1959 | Ende ..................................... | 83/467 |
| 3,986,420 | 10/1976 | Huntley et al. ...................... | 83/435.1 |

Primary Examiner—Robert C. Watson
Attorney, Agent, or Firm—Curtis Ailes

[57] ABSTRACT

The jig includes a base plate slidably positionable upon the tool table and having an upper surface for supporting a work piece which is to be cut. Two parallel guide bars are attached to the underside of the base plate to slide within the guide slots of the tool table. The base plate includes a substantially vertical work advancing abutment extending upwardly from the work-supporting surface, and a through slot extending from the edge opposite to the work advancing abutment for accommodating the cutting tool.

22 Claims, 15 Drawing Figures

UNIVERSAL JIG FOR TABLE ROTARY CUTTING TOOLS

The present invention relates to a jig which is particularly useful for table rotary cutting tools such as table saws of the type which are frequently to be found in woodworking shops.

Table rotary cutting tools, usually powered by electric motors, are extremely convenient in woodworking operations, and such tools are frequently available in private hobbyists' woodworking shops, as well as in schools, and in commercial woodworking establishments. While such tools are very useful, and while they substantially improve the speed of production, the most important problem in the use of such tools is the problem of safety. Many serious accidents have occurred in the use of such tools, usually because the operator moves his fingers into the cutting blade. Students are usually taught to use a piece of scrap wood to advance the work piece into the cutting blade, or to use a guiding device which includes a guide bar which fits into one of the guide slots which are usually provided in the table on both sides of the cutting tool. However, these procedures are often not followed diligently, and do not necessarily prevent accidents and injuries.

Accordingly, it is a major object of the present invention to provide greatly improved safety of operation for table rotary cutting tools.

Another object of the invention is to provide a particularly safe means of operating a table rotary cutting tool by providing a jig for holding a work piece as it is advanced into the cutting tool.

Another major object of the invention is to efficiently and conveniently provide a high degree of accuracy and reproducibility in typical cuts made with a table rotary cutting tool.

One problem in producing a jig for holding work pieces on table rotary cutting tools is that such cutting tools are made by many different manufacturers, and in many different models, and each different model is likely to be made with different dimensions. In particular, such table rotary cutting tools typically include guide grooves in the table top which are parallel to the plane of the cutting tool for guiding work pieces into the cutter. In the different models, these guide grooves are spaced at different dimensions with respect to the cutter, and accordingly, it is difficult to make one jig device which relies upon the guide grooves and which is usable with various different table rotary cutting tool models.

It is another object of the present invention to provide a universal jig for table rotary cutting tools which includes adjustable elements which make the jig adaptable to virtually any make and model of table rotary cutting tool.

Other objects and advantages of the invention will be apparent from the following description and the accompanying drawings.

In carrying out the invention there is provided a jig for holding and feeding work to a table rotary cutting tool of the type having parallel guide slots spaced on opposite sides of the cutter comprising a base plate slidably positionable upon the tool table and having an upper flat surface for supporting a work piece which is to be cut, two parallel guide bars attached to the underside of said base plate and arranged to slide within the guide slots of the tool table to maintain an accurate alignment of said base plate during sliding movement upon the tool table, said base plate including a substantially vertical work advancing abutment extending upwardly from said work supporting surface, and said base plate including a through-slot extending from the edge thereof opposite to said work advancing abutment and having a center line parallel to said guide bars for providing clearance for the cutting tool as work is advanced into the cutting tool by sliding movement of said base plate.

Figures 1, 4, 5, 6:
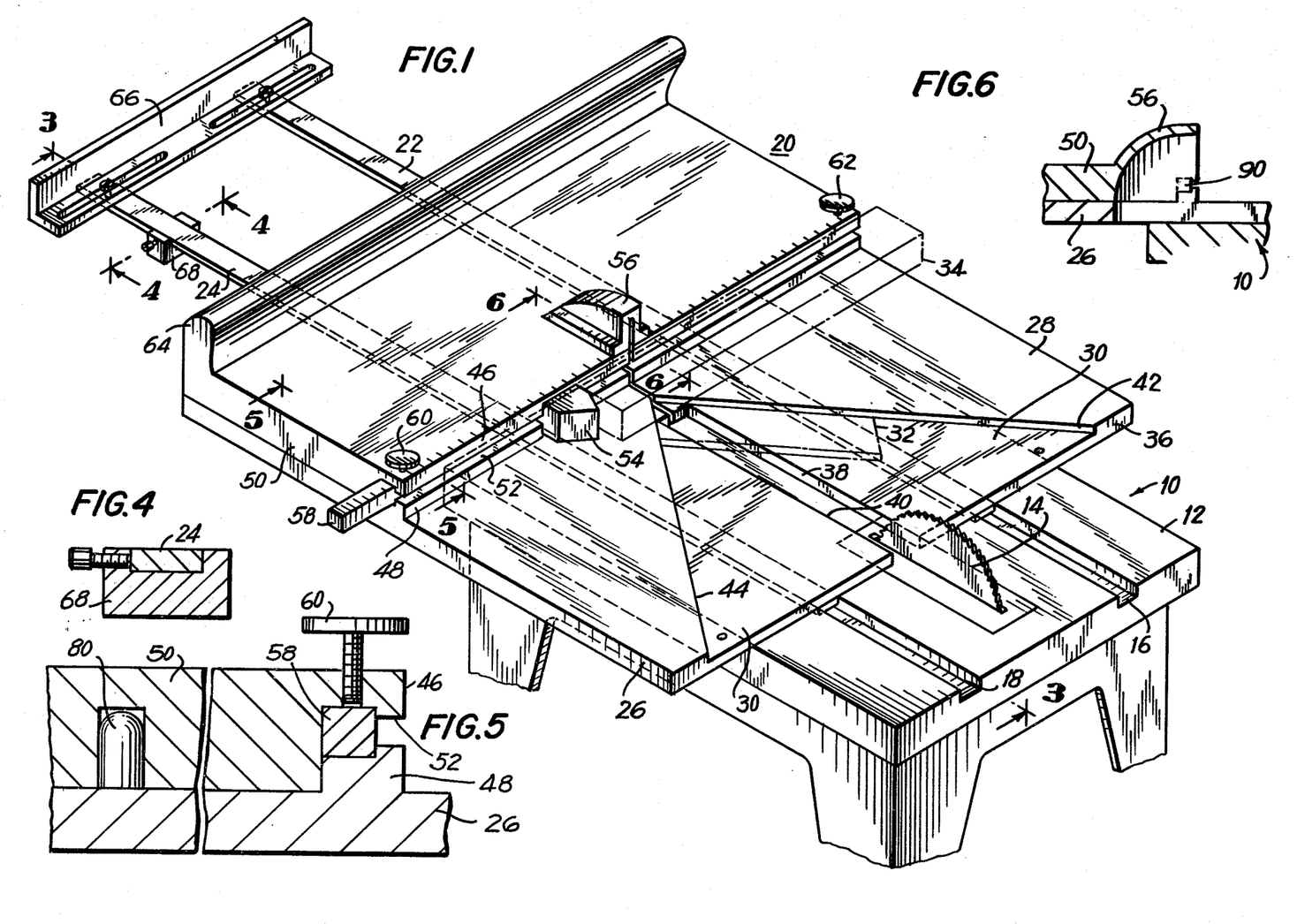
FIG. 1 is a perspective view of a jig embodying the present invention and mounted upon a table rotary cutting tool in the correct operating position.
FIG. 4 is a sectional detail taken at section 4—4 in FIG. 1 and illustrating the construction of a stop member forming a part of the jig.
FIG. 5 is a sectional detail taken at section 5—5 in FIG. 1 illustrating the construction of an abutment.
FIG. 6 is a sectional detail view taken at section 6—6 in FIG. 1 and illustrating details of a guard member.

Referring in more detail to FIG. 1 of the drawings, there is shown at 10 a table rotary cutting tool, such as a table saw, of the type with which the invention is intended to be used. The table rotary cutting tool such as a saw 14 which protrudes through the table top. On each side of the cutting tool 14 there is provided a substantially rectangular cross-section guide groove, as indicated at 16 and 18. The guide grooves are mutually parallel, and parallel to the cutting tool 14. The guide grooves are generally provided for the purpose of guiding work pieces into the cutting tool 14 for cutting by that tool, generally by means of a T-shaped guiding device having a guide rail which fits into only one of the guide grooves 16 or 18.

A preferred embodiment of the jig in accordance with the present invention, and as illustrated in FIG. 1, is indicated generally at 20, and includes guide strips 22 and 24 affixed at the bottom of the jig and arranged to slide within, and cooperate with, both of the guide grooves 16 and 18 respectively. The jig includes a base plate 26 which is slidably positionable upon the tool table surface 12 and which preferably has as many as two flat upper surfaces indicated at 28 and 30 for supporting a work piece which is to be cut. When a work piece is to be cut with a 45° cut, it may be positioned upon the work piece supporting surface 30, as indicated in phantom at 32. When a work piece is to be cut with a 90° cut, it may be supported upon the work supporting surface 28, as indicated in phantom at 34.

From the front edge 36 of the base plate there is a through-slot, the sides of which are indicated at 38 and 40, for providing clearance for the cutting tool 14 as work is advanced into the cutting tool by sliding movement of the jig 20.

With respect to the work piece supporting surface 30, there is provided a substantially vertical work advancing abutment 42 extending upwardly from the work supporting surface 30. The abutment extends outwardly from the through-slot 38–40 at a 45° angle. A corresponding abutment 44 is provided on the other side of the through-slot, and also extending at a 45° angle to the through-slot, so that the two vertical abutments 42 and 44 form a 90° angle with respect to one another. This provides a very secure, trouble-free, and convenient means for supporting a work piece 32 which is to be cut at a 45° angle. Such cuts are particularly useful for picture frames, trim around doorways, and many other similar purposes. Although separated by the through-slot 38–40, and although arranged at a 90° angle with respect to one another, the two abutments 42 and 44 may be regarded as comprising a single vertical abutment since they both serve the work supporting surface 30 of the jig.

The work supporting surface 28 extends back, parallel to the work supporting surface 30, from the upper edges of the vertical abutments 42 and 44 to a vertical abutment generally indicated at 46. Abutment 46 is arranged perpendicular to the through-slot 38–40, and serves to advance the work, such as work piece 34, into the cutter 14 when a 90° cut is required. The abutment 46 is formed partly by a vertical protrusion of 48 from the upper surface of the base plate 26, and partly by a separate cover plate 50 which is attached to the base plate 26. Within the abutment 46 there is preferably provided a T cross-section slot 52 which extends substantially through the entire width of the abutment, and which is adapted to accommodate various attachments, especially including an adjustable stop member 54. These features are described more fully below in conjunction with the other drawings.

The through-slot 38–40 preferably extends through the center of the abutment 46 so as to provide for a complete cutoff of the work piece 34 by the tool 14, if desired. The cover plate 50 preferably includes a guard member 56 which may be integrally formed with the cover plate 50, and which includes an extension of the through-slot 38–40 for accommodating the cutter 14. The guard member 56 completely covers the cutter 14 in the most advanced position of the jig in order to protect the operator from injury by the cutter 14. The stop member 54 is preferably carried by a carrier rod 58 which snugly fits into the bottom (cross-bar) portion of the T-slot 52, and which may be locked in position by means of a thumb screw 60. A corresponding thumb screw is provided on the other side of the jig at 62 for locking the stop member 54 when the stop member is assembled on that side of the jig. At the upper edge of the abutment 46, the cover member may preferably include an integrally formed dimensional scale for convenience in positioning the stop member 54 in order to determine the dimension of the cut for the work piece 34. This is indicated in the drawing. Additionally, if desired, a scale may be provided on the upper edge of the carrier rod 58 for the stop 54 as also illustrated in the drawing. The amount of rod 58 protruding from slot 52 is a function of the position of stop 54.

The cover plate 50 also preferably includes a handle portion 64 extending vertically upward at the rear edge thereof for the convenience of the operator in advancing the jig during operation thereof. Except for the upward handle extension 64 of cover plate 50, and the guard member 56, the upper surface of the cover plate 50 is substantially flat, and extends back from the upper edge of the abutment 46 substantially parallel to the work-supporting surface 28. This surface may be used to temporarily support work pieces on which future cuts are to be made.

The guide strips 22 and 24, which are attached to the bottom of the jig, and form portions thereof, preferably extend back somewhat from the rear portion of the plates 26 and 50, as indicated in the drawing, and a cross member 66 is preferably attached to the ends of these guide strips. The cross member 66 serves to prevent injury to the operator by accidental contact with the ends of the guide strips, and it also serves as an auxiliary pusher handle for advancing the jig to thus advance the work piece into the cutter 14. An adjustable stop member 68 may be preferably clamped to one of the guide strips, such as guide strip 24, to limit the advancing movement of the jig into the cutter 14 to avoid damage to the cutter and to the jig. This is accomplished by adjusting the stop member 68 to a point at which it will engage the rear edge of the Table 12 at the point when the jig is fully advanced into the cutter 14.

It is an important feature of the jig of the invention that it can be used with virtually all makes and models of table cutting tools, even though different makes and models of cutting tools have different spacings between the cutter 14 and the respective guide grooves 16 and 18.

Figure 2:
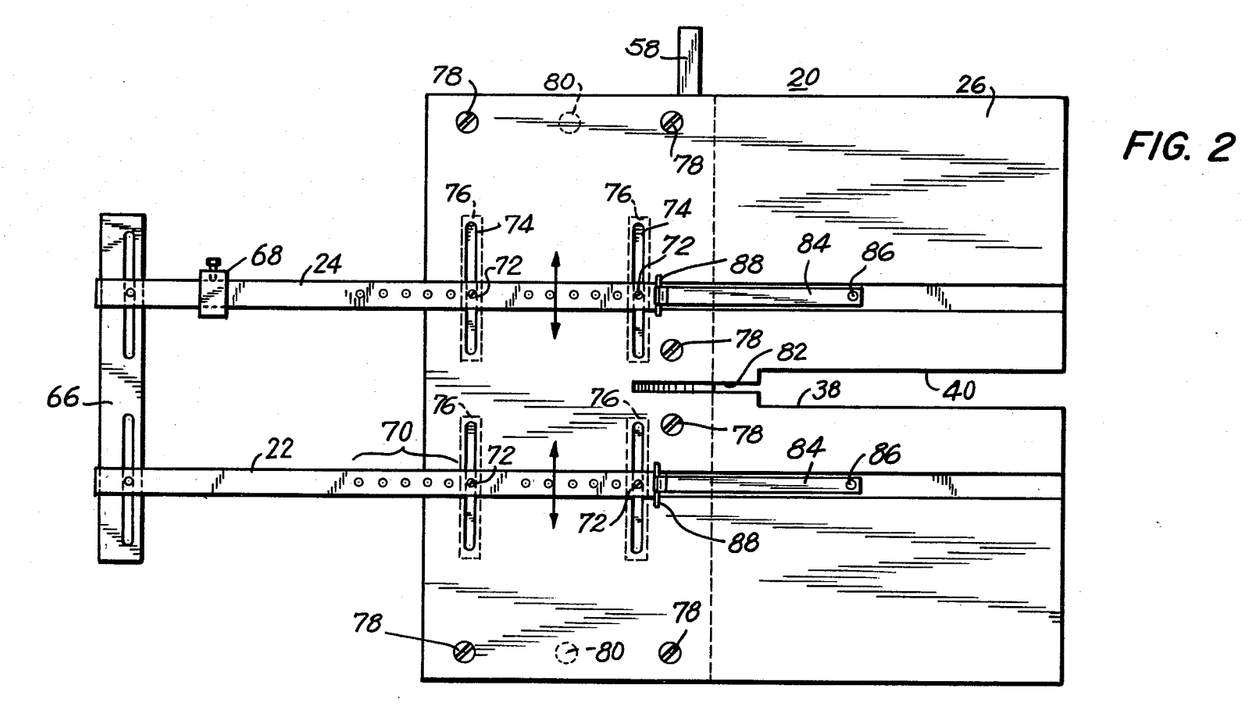
FIG. 2 is a bottom view of the jig of FIG. 1.

FIG. 2 which is a bottom view of the jig of FIG. 1, illustrates how the difference in spacings between the cutter 14 and the grooves 16 and 18 in different makes and models of tools is accommodated by adjusting the lateral positions of the guide strips 22 and 24 with respect to the through-slot 38–40. Thus, the guide strips 22 and 24 each include a series of threaded through-holes arranged along the respective center lines thereof as indicated at 70. Cap screws are then employed, as indicated at 72, to attach the guide strips 22 and 24 to the base plate 26 through slotted openings 74 in the base plate. The cap screws are initially assembled, and later loosened and tightened from the top of base plate 26 while the cover plate 50 is removed.

Figure 3:
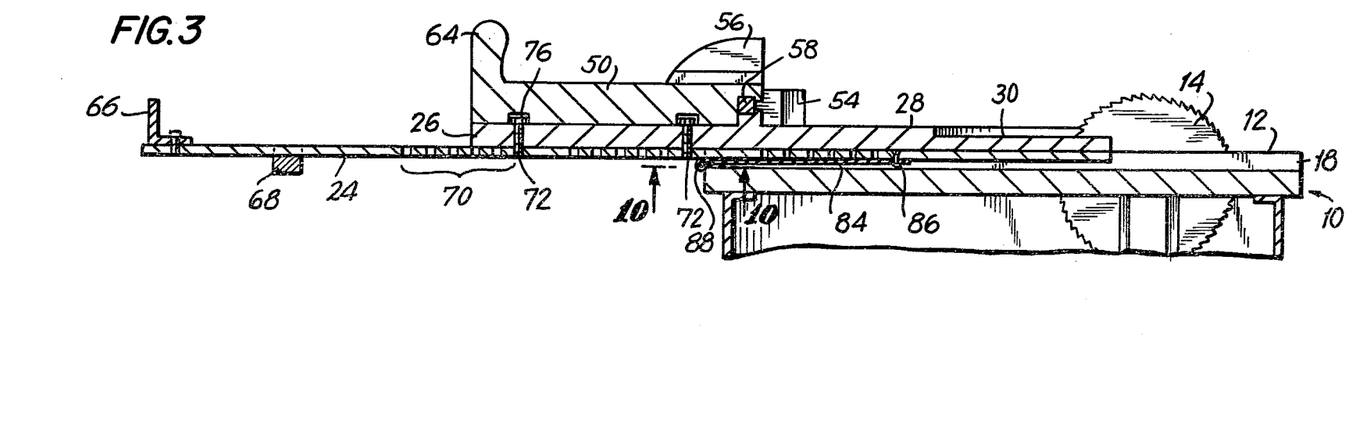
FIG. 3 is a side elevational view of the jig and of the table rotary cutting tool taken at section 3—3 in FIG. 1.

FIG. 3 is a longitudinal vertical sectional view taken at Section 3—3 in FIG. 1 through the jig and the saw table at the center line of the guide strip 24. FIG. 3 illustrates more clearly the cap screws 72 which extend entirely through the base plate 26 and are threadably engaged within the threaded holes 70 in the guide strips 22 and 24. A plurality of spaced threaded holes 70 are provided in order to permit longitudinal adjustment of the guide strips beneath the jig, particularly where it is desirable to adjust the range of position available for the stop 68, and where it is desirable also to adjust the spacing of the cross-bar 66 with respect to the rear edge of the plates 26 and 50.

Transverse slots indicated at 76 are provided in the bottom surface of the cover plate 50 in order to accommodate the heads of the cap screws 72 in the various lateral adjusted positions. However, the cover plate 50, when assembled upon the base plate 26, effectively covers the cap screws 72 so that they are not in the way, and so that the appearance of the device is improved.

If desired, additional attachments (not shown) may be provided near the front edge of the jig (to the right in FIG. 2) for fastening the guide strips 22, 24 to the base plate 26.

Referring again to FIG. 2, the cover plate 50 is preferably attached to the base plate 26 by means of six flat head screws 78 which extend through countersunk holes in the bottom surface of the base plate 26 and into threaded holes (not shown) in the cover plate 50. In order to provide the correct positioning of the cover plate 50 with respect to the base plate 26 as they are fastened together by the fastenings 78, one of the plates is preferably provided with positioning pins 80, each of which extends into a mating hole in the other plate. Preferably the pins are provided in the upper surface of the base plate 26 and extend into corresponding openings in the lower surface of the cover plate 50.

As illustrated, particularly in FIG. 2, the through-slot 38–40 includes a narrow inner section 82 which is only wide enough for a saw blade. The outer wider portion is intended to accommodate a wider cutter blade such as a dado blade, as will be more fully described below.

As an optional feature of the invention, there may be provided beneath the lower surface of the guide strips 22 and 24 a pair of elastic bands 84 which are firmly attached to the bottom of each of the guide strips at one end, as indicated at 86, and which extend towards the back of the jig to a terminal end having a metallic cross-bar indicated at 88. The thickness of the guide strips is not as great as the depth of the guide grooves in the table. Accordingly, there is space to accommodate the elastic strip 84. The strips 84 are adjusted so that, as the forward motion of the jig is advancing the work into the cutter blade 14 nears an end, the cross-bar 88 in the terminal end of each of the elastic strips engages the rear edge of the tool table, as illustrated in FIG. 3. From that point on, further forward motion of the jig stretches the elastic bands 84 so that there is provided on automatic return motion as soon as the jig is released by the operator.

In order to promote clarity, the elastic bands are shown in a more forward position than they would normally have in the use of the device. Thus, they would normally be adjusted rearwardly on the jig so as to engage the rear edge of the table, and cause a restoring force only as the limit stop 68 approached the edge of the table.

FIG. 4 is a cross-section taken at 4—4 in FIG. 1 and illustrating the details of the U-clamp 68 which forms a stop member for the jig by engaging the rear edge of the tool table. It is seen to employ a lock screw to lock it into an adjusted position on the guide strip 24.

FIG. 5 is a detail view in an enlarged scale taken at cross-section 5—5 in FIG. 1, and showing the T-slot 52 in the abutment 46, and the lock screw 60 for the support rod 58 for the stop member 54. FIG. 5 also illustrates the arrangement of the guide pin 80 which extends upwardly from the upper surface of base plate 26 and into a guide hole in the lower surface of the cover plate 50.

FIG. 6 is a view taken at section 6—6 in FIG. 1 and illustrating the details of the interior structure of the guard member 56 at the narrow portion 82 of the slot 38–40. In order to prevent the stop member 54 and its supporting rod 58, or other appliances which are attached at the abutment 46 within the T-slot 52 from intruding into the through-slot 38–40, a barrier is provided in T-slot 52 on each side of the through-slot 38–40, as indicated in FIG. 6 at 90. Barriers 90 are also illustrated in FIGS. 8 and 9 described below.

Figures 7, 8, 9, 10, 11:
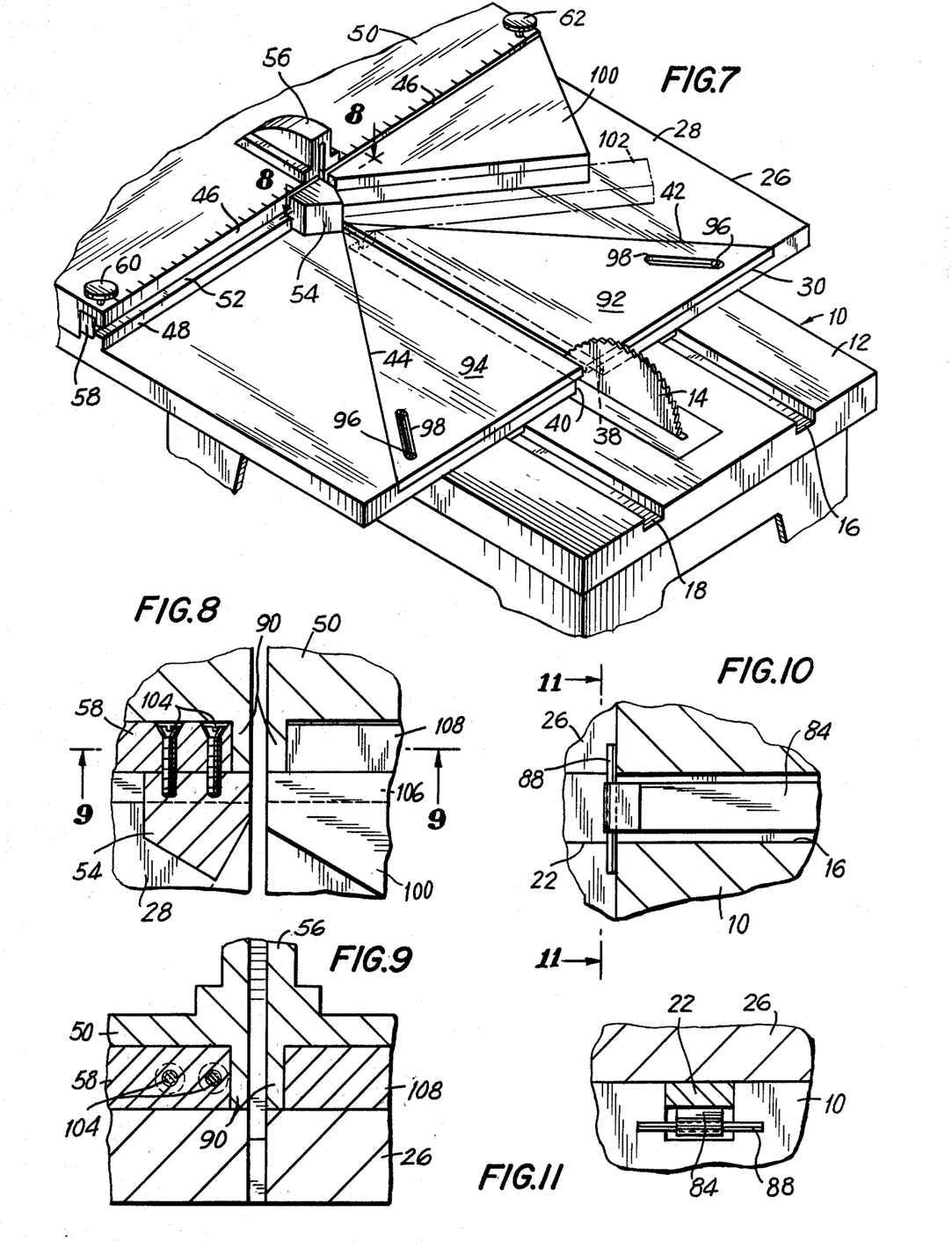
FIG. 7 is a perspective view corresponding to FIG. 1 and illustrating the use of an attachment for making a 30° angle cut on a workpiece.
FIG. 8 is a detail view taken at section 8—8 in FIG. 7 and illustrating details of the construction of the jig and associated attachments.
FIG. 9 is a detail section taken at section 9—9 of FIG. 8 and further illustrating details of construction of the structure of FIG. 7.
FIG. 10 is a sectional detail view taken at a horizontal section through the table of the cutting tool just beneath the bottom surface of the jig and illustrating the construction of an elastic band jig return device.
FIG. 11 is a sectional view taken at section 11—11 in FIG. 10 and further illustrating the elastic band return device.

FIG. 7 is a partial perspective view corresponding to FIG. 1, but illustrating additional features of the invention. The triangular cavities formed by abutments 42 and 44 and the lowest work supporting surface 30 are preferably normally filled in by means of triangular filler plates 92 and 94 whenever the jig is not being employed to produce 45° cuts, such as illustrated with respect to workpiece 32 in FIG. 1. These filler triangular plates 92 and 94 are illustrated in FIG. 7. They are held in assembled relationship upon the base plate 26 by means of screw fastenings 96 which engage the plates 92 and 94 by means of slotted openings 98.

The plates 92 and 94 may be adjusted in and out by movements parallel to the slots 98 and parallel to the abutments 42 and 44. In the closed positions, as illustrated in FIG. 7, the edges of the plates adjacent to the through-slot 38–40 effectively close up that through-slot to a dimension essentially corresponding to the narrow inner portion 82 of the through-slot, and just wide enough to provide clearance for a typical saw blade cutter 14. The plates 92 and 94 are each adjustable to an open position in which they expose the wide dimension of the through-slot 38–40 to accommodate for wider blade elements such as dado blades, as will be described more fully below. The presence of the filler plates 92 and 94 is desirable when cuts other than 45° cuts are being made because they provide a substantially uninterrupted work support surface which is an extension of surface 28. This extension of surface 28 serves to retain the cut ends of the work, providing greater safety for the operator and other nearby personnel.

In accordance with another feature of the invention illustrated in FIG. 7, there is preferably provided a 30°-60° triangular attachment member 100, which may preferably have a thickness substantially equal to the height of the abutment 46, and which includes on one edge thereof a T-shaped flange which exactly fits into the T-slot 52. Accordingly, attachment 100 may be assembled to the jig at the abutment 46 by slipping the T-shaped flange into the T-slot 52 and into the position as indicated in the drawing. The member 100 is preferably moved all the way over to the stop member 90 (hidden in FIG. 7) which interrupts the T-slot 52 at the through-slot 38–40. The stop member 54, which not only has 90° side edges, but also has 30°-60° outer edges, is also assembled on the other side of the T-slot 52 to the central limit position as illustrated in the drawing. With these adjustments, a workpiece 102 shown in phantom is positioned accurately to receive a cut at exactly 60° with respect to the axis of the piece. By turning the 30°-60° triangular attachment 100 around, and assembling it in the opposite direction, a 30° cut may be made. For this purpose, the stop member 54 is also reversed upon its support rod 58. In an alternative construction (not illustrated) the outer edges of the stop member 54 may be radiused instead of formed at a 30°-60° angle. The stop member then need not be reversed when shifting between 30° and 60° cuts.

In order to further illustrate the construction of the stop member 54, its support rod 58, and the triangle attachment 100, FIG. 8 is an enlarged detail sectional view taken at section 8—8 in FIG. 7. It shows that the stop member 54 is assembled upon its support rod 58 by means of flat head screw fastenings 104 so that it may be detached and reversed, if desired. Furthermore, the T-shaped flange of the triangle attachment member 100 is indicated at 106, and 108, showing the narrow neck portion of the flange at 106 and the enlarged tip portion at 108. FIG. 8 also illustrates how both of these elements are assembled into the extreme inward position against the T-slot stop members 90.

FIG. 9 is an enlarged detail cross-section taken at section 9—9 in FIG. 8 and further illustrating details of the construction.

FIG. 10 is an enlarged detail view taken at a horizontal section through the table of the cutting tool just beneath the bottom surface of the jig and illustrating the construction of the elastic band jig return device 84 previously described in conjunction with FIGS. 2 and 3. FIG. 10 particularly illustrates how the cross-member 88 engages the rear edge of the table 10 when the jig approaches the end of its forward travel.

FIG. 11 is a rear sectional view taken at section 11—11 in FIG. 10 and further illustrating the construction of the elastic return device 84.

Figures 12, 13, 14, 15:
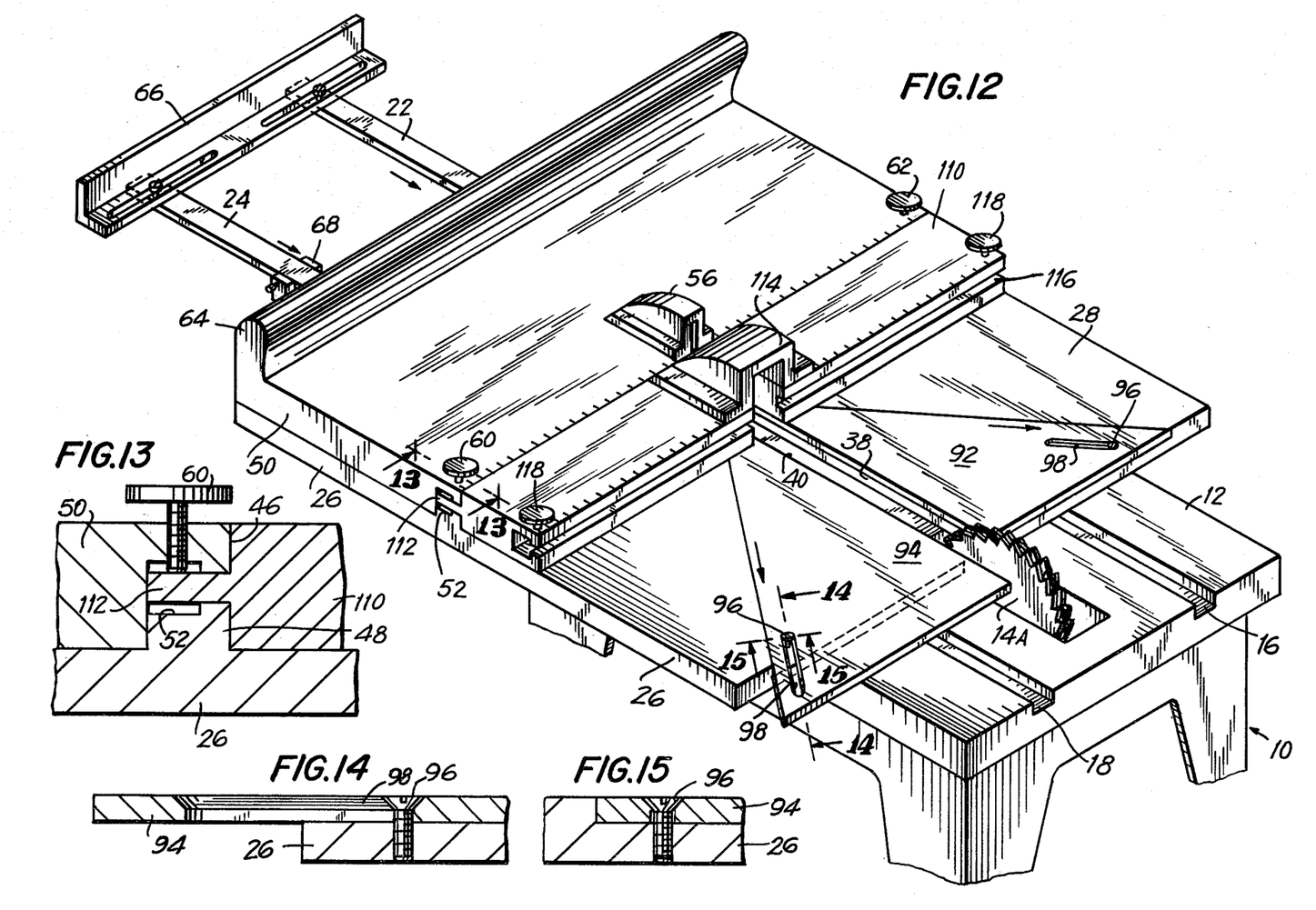
FIG. 12 is a perspective view corresponding to FIG. 1 and illustrating the use of the jig with an attachment, and with adjustments to accommodate for cutting operation by a dado blade.
FIG. 13 is a sectional detail view taken at section 13—13 in FIG. 12 and illustrating the operation of a locking mechanism with respect to the attachment illustrated in FIG. 12.
FIG. 14 is a detail sectional view taken at section 14—14 in FIG. 12 and illustrating a locking mechanism for an adjustable triangular plate which forms a part of the invention.
FIG. 15 is a detail sectional view taken at section 15—15 in FIG. 12 and further illustrating the locking mechanism of FIG. 14.

FIG. 12 is a perspective view of the jig of FIG. 1 together with an auxiliary attachment 110 for the purpose of accommodating a wider cutter blade 14A, such as a dado blade or a molding head cutter. For this purpose, at least one of the triangular plates 94 is moved to the completely open position, as indicated in FIG. 12, to thereby open up at least a part of the enlarged portion of the through-slot 38-40 in the base plate 26. If the mounting arbor for the cutter 14A is on the right, as viewed in the drawing, then the added thickness of the wider cutter 14A is on the left and the left plate 94 is opened. However, if the arbor is on the left, and the added cutter thickness on the right, then plate 92 is opened up. The attachment 110 is preferably just as wide as the total width of the jig, and is firmly attached to the jig by means of a straight tongue 112 which extends back into the T-slot 52. The tongue 112 is necessarily interrupted at the center portion in order to provide clearance for around the stop partitions 90 previously discussed above and particularly shown in FIG. 8. The thumb screws 60 and 62 may then be tightened against tongue 112 to hold the attachment 110 in place. The attachment 110 includes a guard member 114 generally corresponding to guard member 56, except that it is substantially wider and includes a wide central opening to accommodate the wider cutter 14A. The attachment 110 also preferably includes its own T-slot 116 corresponding to T-slot 52 for accommodating the other attachments which may be employed with T-slot 52 as described above. Furthermore, locking thumb screws 118 are also provided for locking the attachments within the T-slot 116.

It is apparent that the attachment 110 provides an advanced abutment for engaging a work piece which is to be fed into the cutter 14A. Furthermore, the advance of the abutment is sufficient to bring the abutment out beyond the narrow portion 82 of the through-slot 38-40 so as to be served entirely by the wide part of the through-slot. Attachment 110 may also be used to accommodate for the narrow saw cutter 14 of FIG. 1 when that saw is tilted about a horizontal axis parallel to slot 38-40 to produce a bevel cut.

FIG. 13 is an enlarged cross-section taken at section 13—13 in FIG. 12 which illustrates the details of the engagement and locking of the attachment 110 within the T-slot 52 by means of the tongue member 112 and thumb screw 60.

FIG. 14 is an enlarged detail taken at section 14—14 in FIG. 12 and further illustrating the mode of attachment of the triangular plate 94 by means of the fastener 96 through the slotted opening 98.

FIG. 15 is another sectional view taken at section 15—15 in FIG. 12 and illustrating the same fastening when viewed at 90° with respect to the view of FIG. 14.

Referring back again to FIG. 7, it will be quite apparent that a triangular attachment such as attachment 100 may be employed in the present invention which has angular sides other than the 30°-60° angles mentioned. Thus, 45° angles may be provided in order to produce required 45° cuts, rather than using the surface 30 and the abutments 42 and 44 as previously described. Furthermore, similar triangular attachments may be employed having any desired angles which are to be used for repetitive cuts.

Two major advantages of the invention, not previously mentioned above, are that the cut ends of the work pieces are always supported upon the upper work-supporting surfaces 28 or 30 of the jig, and are removed from the vicinity of the cutter 14-14A by simple retraction of the jig. Thus, the cut ends are simply, easily, and safely removed by the operator without the necessity for reaching into the close vicinity of the cutter. This is a very important consideration because the cut ends are often very short, and simply stop adjacent to the cutter after they are cut off in the usual prior art operation of table rotary cutting tools. The removal of such cut ends normally presents a serious safety hazard.

Another very important advantage of the invention, not previously mentioned above, is that the jig often effectively increases the width of the table of the table-cutting tool, thus dispensing with the need for side extensions on the cutting table which are often otherwise required. The added table width is very useful because it permits better handling of long work pieces which are to be cross-cut, and reduces the tendency for the cut ends of a work piece which may over-hang the edge of the table or the jig to tilt upwardly at the cut as the cut is being completed, which sometimes causes the work to bind at the cutter.

While this invention has been shown and described in connection with particular preferred embodiments, various alterations and modifications will occur to those skilled in the art. For instance, it will be apparent that the major features of the invention can be carried out in simpler embodiments of the invention which need not incorporate all of the features disclosed in connection with the preferred embodiments. Accordingly, the following claims are intended to define the valid scope of this invention over the prior art, and to cover all changes and modifications falling within the true spirit and valid scope of this invention.

I claim:

1. A jig for holding and feeding work to a table rotary cutting tool of the type having parallel guide slots in the table spaced on opposite sides of the cutter comprising
   a base plate slidably positionable upon the tool table and having an upper flat surface for supporting a work piece which is to be cut,
   two parallel guide bars attached to the underside of said base plate and arranged to slide within the guide slots of the tool table to maintain an accurate alignment of said base plate during sliding movement upon the tool table,
   said base plate including a substantially vertical work advancing abutment extending upwardly from said work supporting surface,
   and said base plate including a through-slot extending into said base plate from the edge thereof opposite to said work advancing abutment and having a center line parallel to said guide bars for providing clearance for the cutting tool as work is advanced into the cutting tool by sliding movement of said base plate.

2. A jig as claimed in claim 1 wherein
   at least one of said guide bars is adjustable in lateral spacing with respect to said through-slot in order to accommodate said jig to tool tables having different spacings between the guide slots of the tool table.

3. A jig as claimed in claim 2 wherein
   both of said guide bars are adjustable with respect to said through-slot by means of adjustable fastenings for accommodation to tool tables having different spacings between the rotary cutting tool and the respective tool table guide slots.

4. A jig as claimed in claim 3 wherein
   said work advancing abutment comprises a plate removably attachable to said base plate and forming an upper surface extending horizontally from the upper edge of said abutment,
   said last-mentioned plate forming a cover to cover and protect the adjustable fastenings of said guide bars to said base plate.

5. A jig as claimed in claim 1 wherein
   there is provided a substantial spacing between said work advancing abutment and the edge of said base plate opposite to said through-slot in order to provide a hand hold for the operator which is spaced substantially away from the work piece as it is being cut in order to protect the operator from injuries by the cutting tool.

6. A jig as claimed in claim 5 wherein
   said edge of said plate opposite to said through-slot includes a vertically raised handle member extending transversely along said edge opposite to said through-slot for the convenience and safety of the operator.

7. A jig as claimed in claim 1 wherein
   said work advancing abutment forms a concave V which is centered upon said through-slot and arranged symmetrically with the legs of the V on opposite sides of said through-slot.

8. A jig as claimed in claim 7 wherein
   the two sides of the V of said abutment are at 90° with respect to one another and at 45° to the center line of said through-slot to provide 45° cuts in the work piece.

9. A jig as claimed in claim 8 wherein
   a second upper flat surface for supporting a work piece extends from the level of the upper edge of said vertical work advancing abutment towards the edge of said base plate opposite to said through-slot,
   said base plate including a second vertical work advancing abutment extending upwardly from said second work supporting surface,
   said second work advancing abutment being positioned at 90° from the center line of said through-slot.

10. A jig as claimed in claim 9 wherein
    triangular filler plates are provided to fit over said first mentioned work supporting surface and against each of the two 45° sides of said first mentioned work advancing abutment to substantially fill the V-shaped space from each side of said abutment over to said through-slot,
    the thickness of said triangular plates being equal to the height of said first mentioned work advancing abutment so that the upper surfaces of said triangular plates provide an extension of said second work supporting surface.

11. A jig as claimed in claim 10 which is usable with either a rotary blade saw, or with a wider dado blade, and wherein said through-slot is wide enough through a substantial portion of its length to accommodate for clearance of the dado blade,
    said triangular plates being arranged in a closed position to cover portions of the side edges of said through-slot to narrow the effective width of said through-slot to the width necessary for clearance of the narrower saw blade,
    said triangular plates being separately adjustable to an open position by movement outwardly parallel to the respective sides of said V-shaped work advancing abutment to thereby move the edges of at least one of said triangular plates adjacent to said through-slot sufficiently to clear the wider portion of said through-slot when the jig is to be used with a dado blade,
    and means for locking said triangular plates in the closed position or in the open position or in an intermediate position.

12. A jig as claimed in claim 1 wherein
    said work advancing abutment is arranged at 90° to the center line of said through-slot to provide for right angle cuts on the work piece.

13. A jig as claimed in claim 12 wherein
    said through-slot extends back through the edge of said work advancing abutment so that a cut may be made by the cutting tool entirely through the work advanced by the abutment,
    and wherein there is provided a guard member extending upwardly from the upper edge of said work advancing abutment and over said through-slot,
    said guard member providing an upper surface extending above the upper extension of the periphery of the cutting tool at the most advanced position of said jig into said cutting tool,
    said guard member being closed at the top to promote the safety of the operator while having a slotted opening in the lower portion thereof which comprises an extension of said through-slot for accommodating the cutting tool.

14. A jig as claimed in claim 12 wherein said work advancing abutment includes a substantially continuous transverse slot in the vertical work advancing face thereof, said slot being intermediate to the top and bottom edges of said abutment face, said transverse slot having a T cross section when viewed in a vertical section parallel to said through-slot, said transverse slot being adapted to receive a device for determining the lateral position of the work piece with respect to said through-slot to thereby determine the position of the cut on the work piece.

15. A jig as claimed in claim 14 wherein there is provided a stop attachment mounted within said transverse T-slot and having a substantially rectangular base portion fitting within and filling the cross bar portion of said T cross section of said transverse T-slot, and said stop attachment including a relatively narrow leg extending through said T-shaped slot and beyond the face of said work advancing abutment to provide an adjustable lateral stop element for determining the position of an outer edge of the work piece as the work piece is advanced by the jig into the cutter.

16. A jig as claimed in claim 14 wherein an attachment locking means is provided which extends from the upper surface of said abutment into said T-shaped slot to lock attachments therein.

17. A jig as claimed in claim 14 wherein there is provided a triangular attachment which comprises a substantially flat triangular member arranged to be positioned in front of said work advancing abutment and having a T-shaped tongue at the edge of said triangular member to be engaged by said work advancing abutment which slides into said T-slot to maintain said triangular attachment in assembled relationship with the remainder of said jig in order to provide an accurately determined angular positioning of the work to be cut by the cutting tool to thereby provide accurately determined angular cuts by the cutting tool.

18. A jig as claimed in claim 14 including an attachment having a tongue arranged to engage within said T-slot and comprising a substantially rectangular plate member arranged for positioning upon said work supporting surface in front of said abutment to thus provide an advanced abutment for a work piece, said attachment including a guard to be positioned above said through-slot and having a tunnel for accommodating a dado blade when a dado blade is used as the cutting tool.

19. A jig as claimed in claim 14 wherein stop elements are provided which extend through, and partially obstruct, said T-slot on each side of said through-slot to prevent the insertion of attachments into the portion of said through-slot which extends through said work advancing abutment.

20. A jig as claimed in claim 1 wherein there is provided a stop member attached to at least one of said guide bars at the end of said guide bar opposite to the edge of said base plate at which said through-slot enters said base plate, said stop element being positioned to engage the edge of the cutting tool table to limit travel of said jig towards the rotary cutting tool.

21. A jig as claimed in claim 20 wherein said stop is adjustably positionable upon said guide bar and said stop includes locking means for locking said stop in an adjusted position.

22. A jig as claimed in claim 1 wherein said guide bars have a vertical dimension less than the normal depth of the guide slots of the tool table, and wherein there is provided at least one elastically deformable rubber-like element attached at one end to the bottom of one of said guide bars and extending from the point of attachment in a direction along said last-mentioned guide bar away from the direction to the edge from which said through-slot extends and beyond the edge of the tool table, said extended end of said elastic member having a molded-in cross-bar having a dimension substantially wider than the width of the tool table guide slot to engage the edge of the tool table so that as the jig is advanced while work is being cut, said elastic member is stretched, said elastic member being operable to automatically retract the jig by recontraction of said elastic member when said jig is released after the cut is completed.

* * * * *

UNITED STATES PATENT AND TRADEMARK OFFICE
CERTIFICATE OF CORRECTION

PATENT NO. : 4,111,409
DATED : September 5, 1978
INVENTOR(S) : Willis A. Smith

It is certified that error appears in the above-identified patent and that said Letters Patent are hereby corrected as shown below:

Column 1, line 62, after "slots" insert --in the table--

Column 2, line 5, after "extending" insert --into said base plate-- line 16, "elevational" should read --sectional-- line 60, insert a comma (,) after "tool"

line 61, insert a comma (,) after "saw 14" and cancel "which"

Column 3, line 5, after "guide" cancel "strips" and substitute --bars (sometimes referred to hereinafter as guide strips)-- line 49, after "protrusion" cancel "of"

Column 5, line 55, first word "on" should read --an--

Signed and Sealed this

Twentieth Day of March 1979

[SEAL]

Attest:

RUTH C. MASON
Attesting Officer

DONALD W. BANNER
Commissioner of Patents and Trademarks